United States Patent
Suh

(10) Patent No.: US 12,477,445 B2
(45) Date of Patent: Nov. 18, 2025

(54) METHOD AND APPARATUS FOR SUPPORTING MONITORING FOR EXTERNAL SERVICES IN A WIRELESS COMMUNICATION SYSTEM

(71) Applicant: SAMSUNG ELECTRONICS CO., LTD., Suwon-si (KR)

(72) Inventor: Dongeun Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/404,773

(22) Filed: Jan. 4, 2024

(65) Prior Publication Data

US 2024/0236823 A1 Jul. 11, 2024

(30) Foreign Application Priority Data

Jan. 6, 2023 (KR) .................. 10-2023-0002324
Feb. 6, 2023 (KR) .................. 10-2023-0015748

(51) Int. Cl.
*H04W 4/00* (2018.01)
*H04W 8/22* (2009.01)
(Continued)

(52) U.S. Cl.
CPC ............. *H04W 48/16* (2013.01); *H04W 8/22* (2013.01); *H04W 24/08* (2013.01); *H04W 28/0268* (2013.01)

(58) Field of Classification Search
CPC ....... H04W 48/16; H04W 24/08; H04W 8/22; H04W 28/0268
(Continued)

(56) References Cited

U.S. PATENT DOCUMENTS

2020/0044943 A1* 2/2020 Bor-Yaliniz ............ H04L 41/18
2022/0141662 A1 5/2022 Liao
(Continued)

FOREIGN PATENT DOCUMENTS

KR 20230120871 A 8/2023

OTHER PUBLICATIONS

International Search Report and Written Opinion of the International Searching Authority dated Apr. 16, 2024, in connection with International Application No. PCT/KR2024/095001, 7 pages.
(Continued)

*Primary Examiner* — Temica M Beamer

(57) ABSTRACT

The disclosure relates to a 5G or 6G communication system for supporting a higher data transmission rate. The method performed by a network exposure function (NEF) entity in a wireless communication system, the method comprising receiving, from an application function (AF) entity, a first message for requesting generation of a quality of service (QOS) flow including information on a set of user equipments (UEs), transmitting, to a plurality of policy control function (PCF) entity, a second message including information for a QoS monitoring report of each UE included in the set of the UEs, receiving, from a user plane function (UPF) entity, QoS monitoring events based on the information for the QoS monitoring report, and transmitting, to the AF entity, of a notification message including QoS monitoring reports for the set of the UEs based on the QoS monitoring events.

2 Claims, 10 Drawing Sheets

(51) Int. Cl.
*H04W 24/08* (2009.01)
*H04W 28/02* (2009.01)
*H04W 48/16* (2009.01)

(58) Field of Classification Search
USPC .......................................................... 370/329
See application file for complete search history.

(56) References Cited

U.S. PATENT DOCUMENTS

2022/0408445 A1* 12/2022 Sun ........................ H04W 72/54
2023/0254719 A1   8/2023 Kim et al.

OTHER PUBLICATIONS

Huawei et al., "Clarifications for QoS monitoring control," TSG SA Meeting #SP-98-e, SP-221348, Dec. 2022, Electronic meeting, 32 pages.
Intel, "Support for request QoS for the AIML communication with each of the members of the group," 3GPP TSG-SA2 Meeting #154, S2-2210808, Toulouse, France, Nov. 2022, 8 pages.
Samsung, "Support of QoS request for a list of UEs and reusing URLLC QoS monitoring for AIML-based services," 3GPP TSG-SA2 Meeting #154, S2-2210570, Toulouse, France, Nov. 2022, 10 pages.
Huawei et al., "Support of GNSS assistance data collection from AF," 3GPP TSG-WG SA2 Meeting #154 S2-2210606, Toulouse, France, Nov. 2022, 6 pages.

* cited by examiner

METHOD AND APPARATUS FOR SUPPORTING MONITORING FOR EXTERNAL SERVICES IN A WIRELESS COMMUNICATION SYSTEM

CROSS-REFERENCE TO RELATED APPLICATIONS

This application is based on and claims priority under 35 U.S.C. § 119 to Korean Patent Application No. 10-2023-0002324 filed on Jan. 6, 2023, and Korean Patent Application No. 10-2023-0015748 filed on Feb. 6, 2023, in the Korean Intellectual Property Office, the disclosure of which is herein incorporated by reference in its entirety.

BACKGROUND

1. Field

The present disclosure relates to a method and apparatus for supporting monitoring for an external service in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mm Wave including 28 GHz and 39 GHz. In addition, it has been considered to implement 6G mobile communication technologies (referred to as Beyond 5G systems) in terahertz (THz) bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service-based architecture or service-based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

An embodiment of the disclosure provides a method and a device for supporting an emergency service and a priority service in a wireless communication system.

The present disclosure provides a device and a method capable of effectively providing a service in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
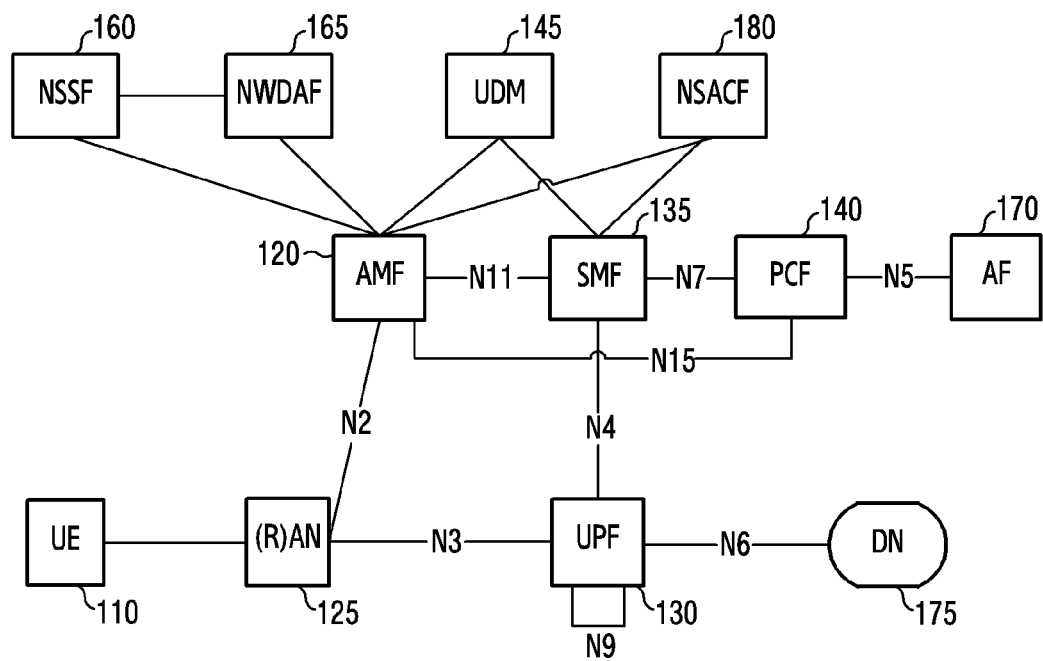
FIG. 1 illustrates an interface and a network structure (or network architecture) of a 5G system according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Furthermore, the "unit" in the embodiments may include one or more processors and/or devices.

The following description of embodiments of the disclosure is mainly directed to New Radio (NR) as a radio access network and Packet Core 5G system or 5G Core Network or Next Generation Core (NG Core) as a core network in the 5G mobile communication standards specified by the 3rd generation partnership project (3GPP) that is a mobile communication standardization group, but based on determinations by those skilled in the art, the main idea of the disclosure may be applied to other communication systems having similar backgrounds through some modifications without significantly departing from the scope of the disclosure.

In 5G systems, a network data collection and analysis function (NWDAF), which is a network function for analyzing and providing data collected in a 5G network, may be defined to support network automation. The NWDAF may collect/store/analyze information from the 5G network and provide the result to at least one network function (NF), and each NF may independently use the analysis result.

The 5G mobile communication system supports the NFs to use the result of collection and analysis of network-related data (hereinafter referred to as network data) through the NWDAF. This is intended to allow each NF to provide the collection and analysis of necessary network data in a centralized form in order to effectively provide its own functions. The NWDAF may collect and analyze network data by using a network slice as a basic unit. However, the scope of the disclosure is not limited to the network slice unit, and the NWDAF may additionally analyze various pieces of information (e.g., quality of service) acquired from a user equipment (UE), a protocol data unit (PDU) session, an NF status, and/or an external service server.

The result analyzed through the NWDAF may be delivered to each NF that has requested the corresponding analysis result, and the delivered analysis result may be used to optimize network management functions such as quality of service (QOS) guarantee/enhancement, traffic control, mobility management, and load distribution.

In the following description, some of terms and names defined in the 3GPP standards (standards for 5G, NR, LTE, or similar systems) may be used for the sake of descriptive convenience. However, the disclosure is not limited by these terms and names and may be applied in the same way to systems that conform other standards.

Furthermore, in the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

FIG. 1 illustrates an interface and a network structure (or network architecture) of a 5G system according to an embodiment of the present disclosure.

Referring to FIG. 1, a network structure of a 5G system may include a user equipment (UE), a radio access network ((R)AN), an access and mobility management function (AMF), a session management function (SMF), a user plane function (UPF), a data network (DN), a network slice selection function (NSSF), a network exposure function (NEF), an authentication server function (AUSF), a network repository function (NRF), a policy control function (PCF), a unified data management (UDM), an application function (AF), and the like.

The UE may refer to a terminal. A 5G-RAN refers to a base station which provides a wireless communication function to the terminal. In FIG. 1, the 5G-RAN is shown as (R)AN. The AMF manages the mobility of the terminal. The SMF manages a packet data network connection provided to the terminal. This connection is called a protocol data unit (PDU) session. The UPF serves as a gateway which transfers a packet transmitted or received by the terminal. The UPF may be connected to a data network (DN) and perform the role of transferring a data packet generated in the 5G system to an external data network. For example, the UPF may be connected to a data network connected to the Internet and route a data packet transmitted by the terminal to the Internet.

The NSSF performs a function of selecting a network slice instance provided to the terminal. The NEF can access to information of managing the terminal in a 5G network, and thus is connected to network functions (NFs) of a 5G core network, such as a subscription to a mobility management event of the corresponding terminal, a subscription to a session management event of the corresponding terminal, a request for session-related information, a configuration of charging information for the corresponding terminal, and a request to change a PDU session policy for the corresponding terminal, to perform the role of transferring information on the terminal to the corresponding NFs or reporting the information on the terminal to the outside. The AUSF performs terminal authentication in a 3GPP access network and a non-3GPP access network. The NRF performs a function of discovering an NF. The PCF applies a mobile communication service provider's service policy, charging policy, and PDU session policy to the terminal. The UDM stores and manages data such as subscriber data and policy control data. The AF may use a service and a function provided by the 5G network through the NEF.

Furthermore, although not shown in FIG. 1, the network of the 5G system may further include other network functions (NFs). For example, the network may further include a unified data repository (UDR) which stores various pieces of function data such as PCF data, UDM data, and NEF data.

In a 3GPP system, a conceptual link for connecting NFs in the 5G system is defined as a reference point. The followings are reference points included in a 5G system architecture.

N1: a reference point between a UE and an AMF;
N2: a reference point between an (R)AN and an AMF;
N3: a reference point between an (R)AN and a UPF;
N4: a reference point between an SMF and a UPF;
N5: a reference point between a PCF and an AF;
N6: a reference point between a UPF and a DN;
N7: a reference point between an SMF and a PCF;
N8: a reference point between a UDM and an AMF;
N9: a reference point between two core UPFs;
N10: a reference point between a UDM and an SMF;
N11: a reference point between an AMF and an SMF;
N12: a reference point between an AMF and an AUSF;
N13: a reference point between a UDM and an authentication server function (AUSF);
N14: a reference point between two AMFs; and
N15: a reference point between a PCF and an AMF in the case of a non-roaming scenario and a reference point between a PCF within a visited network and an AMF in the case of a roaming scenario.

Network slicing in the 5G system refers to a technology which enables virtualized, independent, and multiple logical networks in one physical network. A network service provider may provide a service by configuring a virtual end-to-end network referred to as a network slice in order to satisfy specialized requirements of a service and/or an application. In this case, the network slice is identified by an identifier referred to as single-network slice selection assistance information (S-NSSAI). The network may transmit an allowed slice set (for example, allowed NSSAI(s)) to a terminal in a terminal registration procedure (for example, a UE registration procedure), and the terminal may transmit or receive application data via a protocol data unit (PDU) session generated through one S-NSSAI (for example, a network slice) among the allowed slice set.

A mobile communication system may receive identifier information and monitoring information (for example, information for which a notification is to be received) of terminals requiring monitoring from an external third-party server (for example, an application function (AF)). Further, the mobile communication system may monitor the corresponding terminals. For example, if information received from the AF requires a notification of the occurrence of a specific event (for example, if a delay time is detected to be equal to or greater than a specific value, corresponding terminal information, etc. is notified to the AF), the mobile communication system may collect the corresponding information and transmit the information to the AF.

In addition, when an application service provider (ASP) operates a service based on a machine learning (ML) model, a more improved service may be provided by training a machine learning model based on collected data.

In order to train a machine learning model, the ASP may use federated learning (FL) in which multiple devices participate. In other words, an application running on each terminal may train a local model by using collected local data and transmit only the resulting local update (for example, gradient) to a server. Further, the server may collect local updates from applications to train global models and distribute the trained global models back to the applications. Meanwhile, in order to efficiently perform FL learning, the ASP may change a terminal participating in the FL. In this case, when considering network conditions of terminals participating in the FL learning, for example, a computing/network resource used for the FL learning may be used more efficiently through determination such as excluding a terminal with a very poor network condition from the FL learning.

The disclosure provides a method for providing network environment information relating to predetermined terminals to an external ASP in a 5G system.

Figure 2:
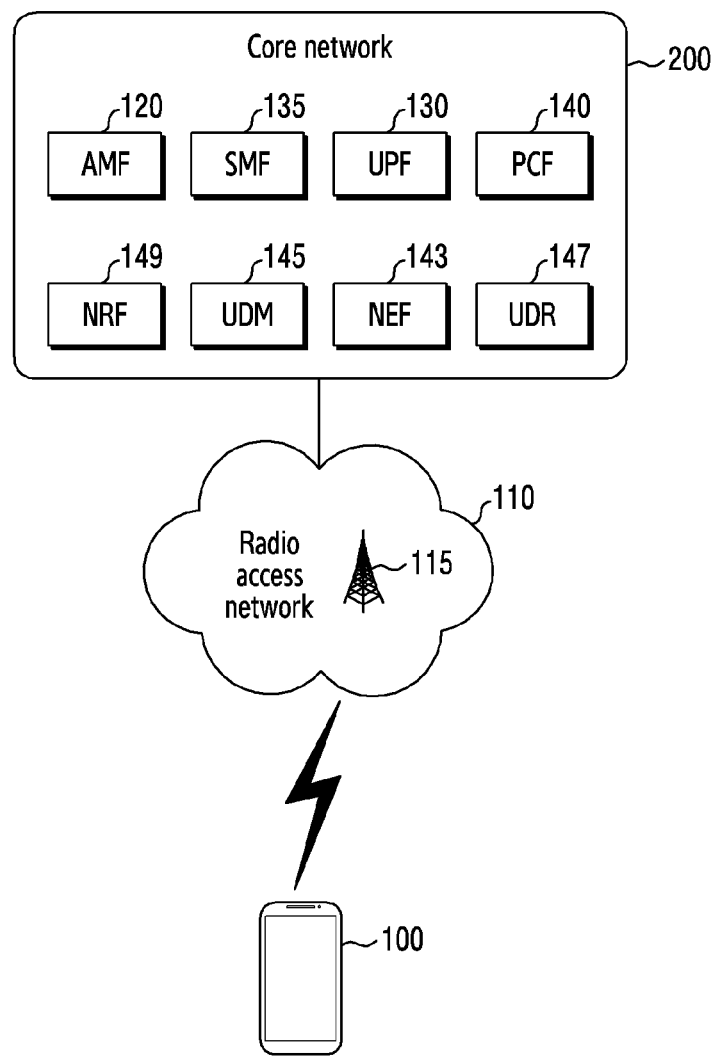
FIG. 2 illustrates a wireless environment including a core network in a wireless communication system according to various embodiments of the present disclosure.

FIG. 2 illustrates a wireless environment including a core network in a wireless communication system according to various embodiments of the present disclosure.

Referring to FIG. 2, a wireless communication system may include a radio access network (RAN) 110 and a core network (CN) 200.

The radio access network 110 is, as a network directly connected to a user device, for example, a terminal 100, an infrastructure which provides wireless access to the terminal 100. The radio access network 110 may include a set of a plurality of base stations including a base station 115, and the plurality of base stations may perform communication through interfaces configured therebetween. At least a part of the interfaces between the plurality of base stations may be wired or wireless. The base station 115 may have a structure divided into a central unit (CU) and a distributed unit (DU). In this case, one CU may control a plurality of DUs. The base station 115 may be referred to as an "access point (AP)," a "next generation node B (gNB)," a "5th generation node (5G node)," a "wireless point," a "transmission/reception point (TRP)," or another term having a technical meaning equivalent thereto, in addition to a base station. The terminal 100 accesses the radio access network 110 and communicates with the base station 115 through a wireless channel. The terminal 100 may be referred to as a "user equipment (UE)," a "mobile station," a "subscriber station," a "remote terminal," a "wireless terminal," a "user device," or another term having a technical meaning equivalent thereto, in addition to a terminal.

The core network 200 is a network for managing the entire system and controls the radio access network 110 and processes data and control signals for the terminal 100 transmitted or received through the radio access network 110. The core network 200 performs various functions such as control of a user plane and a control plane, processing of mobility, management of subscriber information, charging, and interworking with other types of systems (e.g., a long term evolution (LTE) system). In order to perform the various functions described above, the core network 200 may include multiple entities functionally separated and having different network functions (NFs). For example, the core network 200 may include an AMF 120, an SMF 135, a UPF 130, a PCF 140, a network repository function (NRF) 149, a UDM 145, a network exposure function (NEF) 143, and a UDR 147.

The terminal 100 is connected to the radio access network 110 and accesses the AMF 120 which performs a mobility management function of the core network 200. The AMF 120 is a function or a device that is responsible for both access to the radio access network 110 and mobility management of the terminal 100. The SMF 135 is an NF which manages a session. The AMF 120 is connected to the SMF 135, and the AMF 120 routes a session-related message for the terminal 100 to the SMF 135. The SMF 135 connects to the UPF 130, allocates a user plane resource to be provided to the terminal 100, and establishes a tunnel for transmitting data between the base station 115 and the UPF 130. The PCF 140 controls information related to charging and policy for a session used by the terminal 100. The NRF 149 performs a function of storing information on NFs installed in a mobile communication service provider network and informing of the stored information. The NRF 149 may be connected to all NFs. When each NF starts running on a service provider network, each NF notifies the NRF 149 that a corresponding NF is running on the network by performing registration with the NRF 149. The UDM 145 is an NF which performs a similar role to a home subscriber server (HSS) of a 4G network and may store subscription information of the terminal 100 or a context used by the terminal 100 within the network.

The NEF 143 may perform the role of connecting a third-party server and an NF within a 5G mobile communication system. In addition, the NEF 143 may perform the role of providing data to the UDR 147, updating, or obtaining data. The UDR 147 may perform a function of storing subscription information of the terminal 100, storing policy information, storing data exposed to the outside, or storing information required for a third-party application. In addition, the UDR 147 may also perform the role of providing stored data to another NF.

Figure 3:
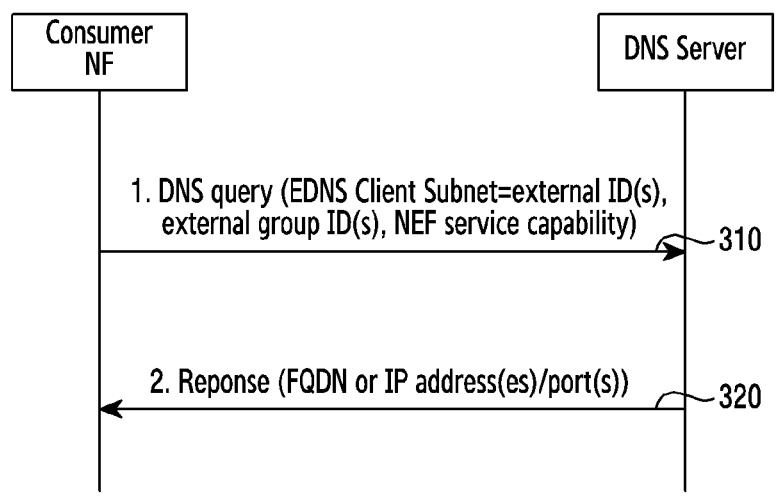
FIG. 3 illustrates a procedure in which a consumer NF located in an untrusted domain obtains information on a NEF for monitoring according to various embodiments of the present disclosure.

FIG. 3 illustrates a procedure in which a consumer NF located in an untrusted domain obtains information on an NEF 143 (for example, external service assistance NEF) for monitoring according to various embodiments of the present disclosure. Hereinafter, an NEF may refer to the NEF 143 of FIG. 2.

Referring to FIG. 3, in operation 310, a consumer NF located in an untrusted domain (for example, a network which cannot communicate directly with NFs located in a service provider network) may include at least one piece of the following information in a DNS query message transmitted to a DNS server to obtain an NEF address.

External ID(s) for UE(s) (for example, generic public subscription identifier(s) (GPSI(s))) or external group ID(s) indicating UE(s) may be included.

NEF service capability: service capability information of the NEF may be included. When the consumer NF is an AF and desires to select an NEF which supports external service assistance capability, the NEF service capability may include information indicating the external service assistance capability. In the case of the NEF which supports the external service assistance capability, at least one of the following functions may be provided to an external service (for example, an app service operated by a third party). Alternatively, the NEF service capability may include information on whether each of the following functions is supported.

QOS request function for a list of UE addresses: an interface capable of requesting generation of a QoS flow having the same QoS requirement (for example, delay or bitrate) for a plurality of UE addresses (for example, a list of UE addresses) may be provided to the consumer NF (for example, the AF). An interface capable of requesting generation of a QoS flow by including a list of UE addresses in one message may be provided.

QoS monitoring for a list of UE addresses: an interface capable of requesting QoS monitoring information (for example, delay or bitrate of a QoS flow per UE for a plurality of UEs) for a plurality of UE addresses (for example, a list of UE addresses) may be provided to the consumer NF (for example, the AF). An interface capable of requesting QoS monitoring information by including a list of UE addresses in one message may be provided.

Provision of load prediction information for each time zone: for an area of interest provided by the consumer NF (for example, the AF), the NEF provides time-dependent load prediction information of base station(s) within the area of interest to the consumer NF (for example, the AF). The NEF may obtain the time-dependent load prediction information of the base station(s) within the area of interest from an NWDAF.

Candidate UE selection function: if the consumer NF (for example, the AF) includes a list of UE addresses and information for requesting to select UEs which meet a specific condition among UEs in a message transmitted to the NEF, the NEF may provide a list of candidate UE address information including the selected UEs to the consumer NF (for example, the AF). The NEF may select at least one UE, based on analysis information obtained from the NWDAF. A condition (for example, a minimum delay value for a terminal's QoS flow) which may be used at the time of selecting a candidate UE included in the message transmitted by the consumer NF (for example, the AF) to the NEF may include a minimum bitrate value for a terminal's QoS flow. If the consumer NF is an AF and requests an NEF for information exposure, a DNS query message may include information (for example, exposal capability) indicating an NEF which supports a specific function. When the AF requests an NEF which supports at least two functions, all of at least two parameters may be included in NEF capability.

EDNS client subnet: the AF may store different EDNS client subnets for each NEF(s) supporting functions within NEF capability. When the AF requests an NEF address which supports a specific function, a DNS query message may include corresponding EDNS client subnet information.

In operation 320, the DNS server may include address information of NEF(s) supporting function(s) included in the NEF service capability received in operation 310 in a response message transmitted to the consumer NF. The DNS server may be responsible for UEs corresponding to the external ID(s) or external group ID(s) received in operation 310. The DNS server may support functions included in the NEF service capability received in operation 310. Further, the DNS server may transmit a response message including at least one of a fully qualified domain name (FQDN), an IP address, or a port number for NEF(s) belonging to the EDNS client subnet received in operation 310 to the consumer NF.

Figure 4:
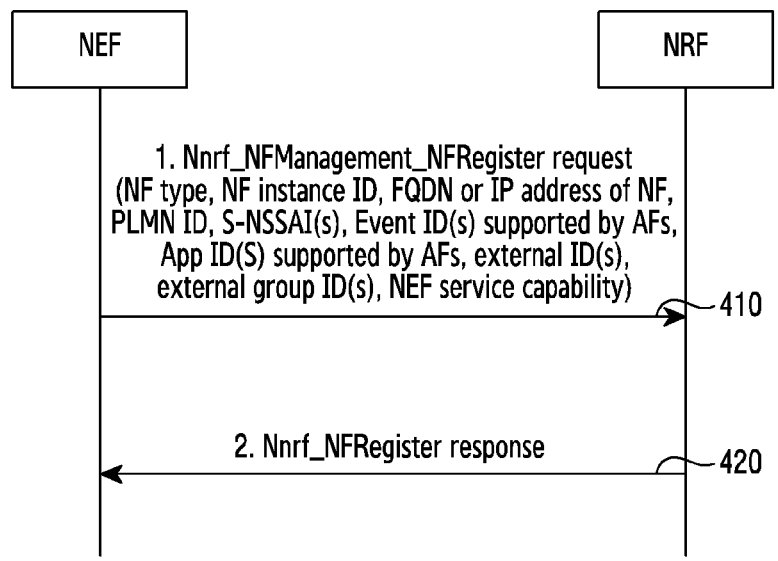
FIG. 4 illustrates a method in which an NEF for monitoring registers its own information in a NRF according to various embodiments of the present disclosure.

FIG. 4 illustrates a method in which an NEF for monitoring registers its own information in an NRF according to various embodiments of the present disclosure.

Referring to FIG. 4, in operation 410, an NEF may include at least one piece of the following information in a message transmitted for registration with an NRF.

NF type: information indicating the NEF may be included.

At least one of NF instance ID, FQDN, or IP address of NF, and PLMN ID: each may include an NEF instance ID, an IP address or an FQDN of an NEF, and an identifier of a PLMN to which the NEF belongs.

S-NSSAI(s): this may indicate identifier information of slices supported by the NEF.

Event ID(s) supported by AFs, App ID(S) supported by AFs: each may include event ID(s) and app ID(s) supported by AFs.

External ID(s), external group ID(s): each may include external identifier(s) of a UE (for example, GPSI) and external group identifier(s) indicating UE(s).

NEF service capability: information on function(s) supported by the NEF may be included. In the case of an NEF which supports external service assistance capability, at least one of the following functions may be provided to an external service (for example, an app service operated by a third party). Alternatively, the NEF service capability may include information on whether each of the following functions is supported.

QOS request function for a list of UE addresses: an interface capable of requesting generation of a QoS flow having the same QoS requirement (for example, delay or bitrate) for a plurality of UE addresses (for example, a list of UE addresses) may be provided to a consumer NF (for example, an AF). An interface capable of requesting generation of a QoS flow by including a list of UE addresses in one message may be provided.

QoS monitoring for a list of UE addresses: an interface capable of requesting QoS monitoring information (for example, delay or bitrate of a QoS flow per UE for a plurality of UEs) for a plurality of UE addresses (for example, a list of UE addresses) may be provided to the consumer NF (for example, the AF). An interface capable of requesting QoS monitoring information by including a list of UE addresses in one message may be provided.

Provision of load prediction information for each time zone: for an area of interest provided by the consumer NF (for example, the AF), the NEF provides time-dependent load prediction information of base station(s) within the area of interest to the consumer NF (for example, the AF). The NEF may obtain the time-dependent load prediction information of the base station(s) within the area of interest from an NWDAF.

Candidate UE selection function: if the consumer NF (for example, the AF) includes a list of UE addresses and information for requesting to select UEs which meet a specific condition among UEs in a message transmitted to the NEF, the NEF may provide a list of candidate UE address information including the selected UEs to the consumer NF (for example, the AF). The NEF may select at least one UE, based on analysis information obtained from the NWDAF. A condition (for example, a minimum delay value for a terminal's QoS flow) which may be used at the time of selecting a candidate UE included in the message transmitted by the consumer NF (for example, the AF) to the NEF may include a minimum bitrate value for a terminal's QoS flow.

In operation 420, the NRF may store the information received in operation 410 from the NEF. The NRF may transmit a response message including result (for example, success or failure) information for NF registration to the NEF.

Figure 5:
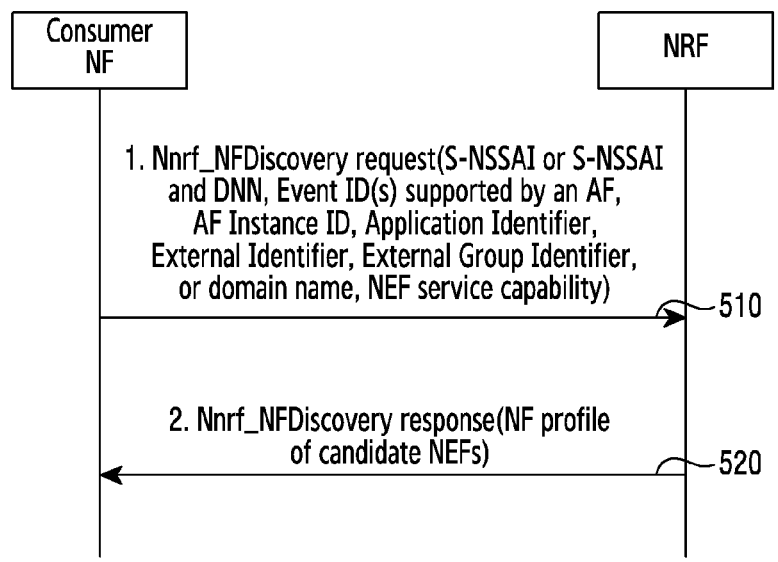
FIG. 5 illustrates a procedure in which a consumer NF located in a trusted domain obtains an address of an NEF for monitoring according to various embodiments of the present disclosure.

FIG. 5 illustrates a procedure in which a consumer NF located in a trusted domain obtains an address of an NEF for monitoring according to various embodiments of the present disclosure.

Referring to FIG. 5, in operation 510, a message transmitted by a consumer NF (for example, an AF) located in a trusted domain (for example, a network which can communicate with NFs in a 5G network without separate authentication) to an NRF to obtain an address of an NEF may include at least one piece of the following information.

S-NSSAI or S-NSSAI and DNN: slice identifier information desired by the consumer NF or slice identifier information and DNN information may be included.

Event ID(s) supported by an AF, AF instance ID, application identifier: each may include event ID(s) (for example, if the consumer NF is an AF) supported by AFs, an AF instance ID (for example, if the consumer NF is an AF), and app ID(s).

External identifier, external group identifier, or domain name: each may include external identifier(s) (for example, GPSI) of a UE, external group identifier(s) indicating UE(s), or a domain name.

NEF service capability: service capability information of the NEF may be included. When the consumer NF is an AF and desires to select an NEF which supports monitoring, etc., information (for example, external service assistance capability) indicating an NEF which supports external service assistance may be included. If the consumer NF is an AF and requests an NEF for information exposure, information (for example, exposal capability) indicating an NEF which supports a corresponding function may be included. When the consumer NF requests an NEF which supports at least two functions, all parameters indicating the corresponding at least two functions may be included in the NEF service capability.

Figure 6:
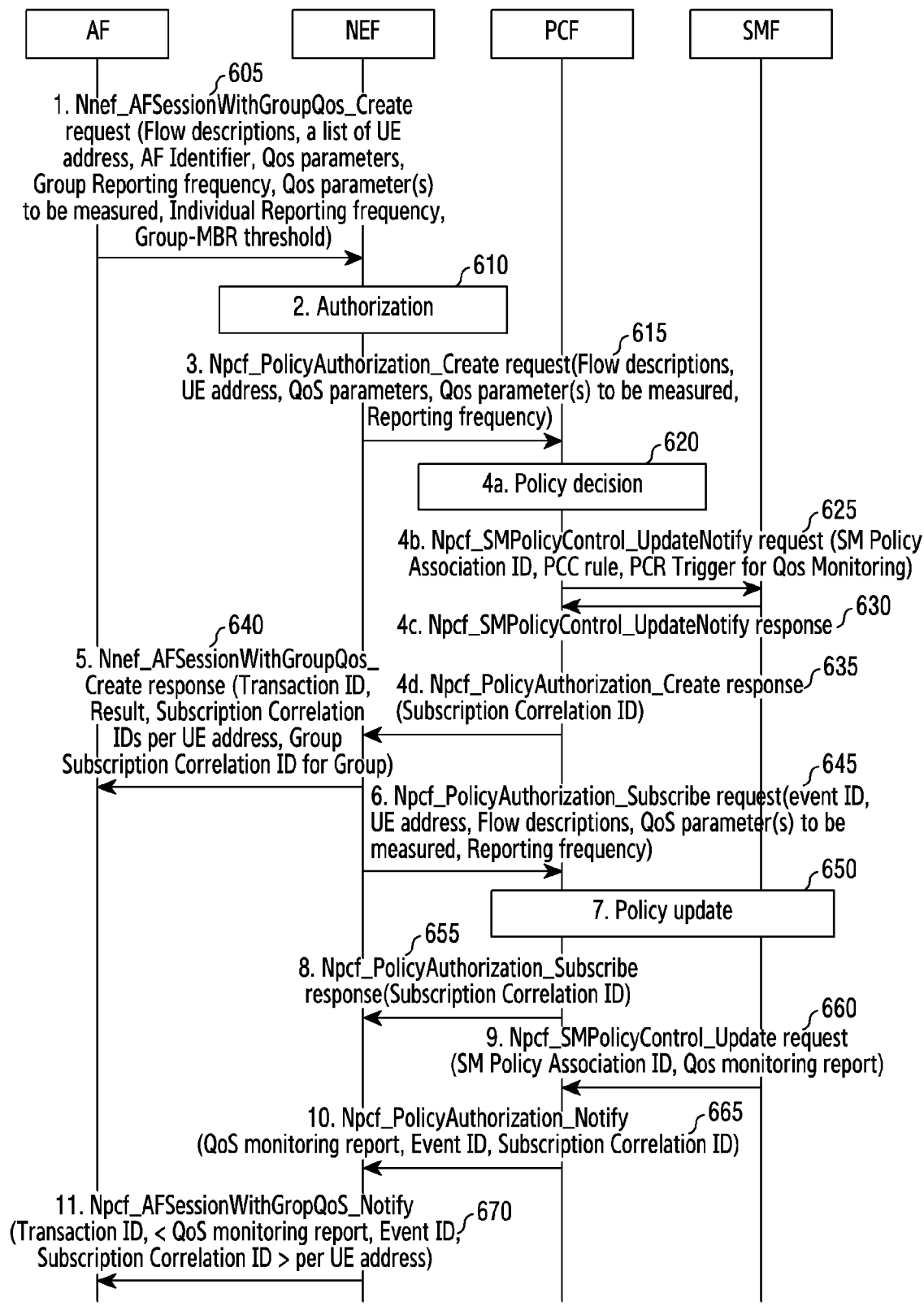
FIG. 6 illustrates a procedure in which an AF requests generation of a QoS flow, requests monitoring, and receives monitoring information, through an NEF according to various embodiments of the present disclosure.

FIG. 6 illustrates a procedure in which an AF requests generation of a QoS flow, requests monitoring, and receives monitoring information, through an NEF, according to various embodiments of the disclosure. Nnef_AFsessionWithGroupQoS_Create request, Nnef_AFsessionWithGroupQoS_Create response, and Nnef_AFsessionWithGroupQoS_Notify used in FIG. 6 are used for convenience of description, and other names may be used (for example, Nnef_AFsessionsWithSameQoS_Create request, Nnef_AFsessionsWithSameQoS_Create response, Nnef_AFsessionsWithSameQoS_Notify, etc.).

Referring to FIG. 6, in operation 605, an AF may transmit, to an NEF, a message for requesting generation of a QoS flow of a PDU session per UE for a plurality of UEs (for example, a group of UEs). If monitoring information provided by the NEF for the plurality of UEs (for example, a downlink (or uplink) bitrate sum for the plurality of UEs) is greater than a downlink (or uplink) threshold, a message for, to the AF, reporting information indicating that the downlink (or uplink) bitrate sum for the plurality of UEs is greater than the downlink (or uplink) threshold, and requesting generation of a QoS flow, QoS monitoring, and/or group monitoring may include at least one piece of the following information:

Flow description(s): flow information for each service (for example, including at least one of a server IP address, a server port number, and protocol information);

A list of UE addresses (or UE address and group ID): when the NEF provides an interface for receiving a list of UE addresses at once, the AF may transmit a message for requesting generation of a QoS flow including a list (for example, a list of UE addresses) of terminal addresses (for example, including at least one of an IP address, a MAC address, GPSI, or external identity). Alternatively, when the NEF does not provide an interface for receiving a list of UE addresses at once, the AF may transmit a message for requesting generation of a QoS flow including one UE address and group ID. When the NEF does not provide an interface for receiving a list of UE addresses at once, a QoS flow request and/or QoS monitoring request message may be transmitted for each UE at the time of performing a QoS request for the plurality of UEs;

AF identifier: an AF identifier;

QoS parameter: this may indicate a QoS parameter required for a QoS flow. Requested 5GS delay, requested priority, requested guaranteed bitrate, and requested maximum bitrate may be included; And DNN, S-NSSAI: this may indicate a data network name (DNN) and S-NSSAI of a PDU session. The DNN and S-NSSAI may be configured for requesting generation of a QoS flow within a PDU session established through a specific DNN or S-NSSAI.

If generation of a QoS flow and QoS monitoring are requested through a message for requesting generation of a QoS flow, the AF may include at least one piece of the following information in a message transmitted to the NEF. In this case, all QoS flows requested through at least one piece of information described above may be subjects to be monitored.

QoS parameter(s) to be measured: information desired to be monitored for each QoS flow (for example, including at least one of uplink delay, downlink delay, uplink bitrate, or downlink bitrate) may be included;

Target of reporting: at least one of an address of an NF (for example, an AF, an NEF, etc.) which desires to receive a monitoring report or a notification correlation ID may be included. The notification correlation ID may be information including an AF transaction ID;

Reporting frequency: when a periodic manner (for example, periodically transmitting a monitoring report) is indicated, a reporting period may be included. In the case of an event-triggered manner (for example, transmitting a monitoring report when a downlink (or uplink) bitrate (or latency) exceeds a threshold value), a reporting threshold and a minimum waiting time (for example, a minimum time between report transmissions) may be included.

An indication of direct event notification: when a UPF desires to transmit monitoring information to a target of reporting, indication of direct event notification may be included;

Group monitoring information: information which may be included when the AF requests QoS monitoring, etc. for a group of UEs (or a list of UE addresses). At least one piece of the following information may be included;

information to be measured: this may indicate information on a subject to be monitored for a group (for example, a list of UE addresses). For example, the information to be measured may indicate uplink Group-MBR, downlink Group-MBR, and the like. If the group monitoring information is information only for monitoring for Group-MBR, only flow direction information (for example, an uplink or a downlink) may be included;

reporting frequency: when a periodic manner (for example, periodically transmitting a monitoring report) is indicated, a reception period (for example, a reporting period) of monitoring information may be included, and in the case of an event-triggered manner, a reporting threshold and a minimum waiting time (for example, a minimum time between report transmissions) may be included. If the group monitoring information is information only for monitoring for Group-MBR, a reporting frequency may indicate a group-MBR threshold (group-MBR threshold: this may indicate a bitrate threshold value, and if the AF desires to receive a notification of a situation where the sum of bitrates of all QoS flows subject to monitoring is higher than the bitrate threshold value, the AF may include the group-MBR threshold in a message for requesting generation of a QoS flow.). In addition, if necessary, a minimum waiting time may be included.

In operation 610, the NEF may perform an authentication procedure for the message received from the AF, based on information (for example, an AF identifier) included in the message received from the AF. If the message received in operation 605 includes group monitoring information (or Group-MBR threshold), the NEF may generate a subscription to the group monitoring information and generate a subscription correlation ID for group for the subscription to the group monitoring information. The NEF may store information (for example, an uplink or downlink group-MBR threshold) included in the group monitoring information received in operation 605 for the subscription correlation ID for group. In addition, when the message received in operation 605 includes at least one of the QoS parameter(s) to be measured, target of reporting, or reporting frequency (optionally, indication of direct event notification) information, through configuration information or self-determination, the NEF may generate a subscription correlation ID for aggregation.

In operation 615, when authentication of the message is successful in operation 610, the NEF may identify a PCF address responsible for each UE address through a binding support function (BSF) for the list of UE addresses included in operation 605.

If the NEF receives at least one of the QoS parameter(s) to be measured, target of reporting, or reporting frequency (optionally, indication of direct event notification) information in operation 605 (for example, the AF requests monitoring of information for each UE) and simultaneously receives group monitoring information (for example, the AF requests information on a group, for example, monitoring of Group-MBR), with respect to each case, the NEF may transmit, to a PCF, a separate request message (for example, Npcf_PolicyAutohrization_Create request) for each UE included in the list of UE addresses (for example, for one UE, transmit each of a request message for monitoring of information for each UE and a request message for monitoring of group information), or transmit an integrated request message for each UE.

The NEF may include at least one piece of the following information in a message transmitted to the PCF for each UE address:

UE address: a UE identifier;

flow description(s): the flow description received in operation 605;

QoS parameter: the QoS parameter received in operation 605;

DNN, S-NSSAI: the DNN and S-NSSAI received in operation 605; and

The NEF may determine when to include information such as the QoS parameter(s) to be measured, target of reporting, and reporting frequency in the message transmitted to the PCF (for example, operation 615 or operation 645).

If the NEF determines to include the QoS parameter(s) to be measured, target of reporting, and reporting frequency in operation 615, the message transmitted to the PCF in operation 615 may further include at least one piece of the following information:

QoS parameter(s) to be measured: the QoS parameter(s) to be measured, which is received in operation 605. If the NEF receives the group monitoring information in operation 605 and the Npcf_PolicyAutohrization_Create request message is a message (or an integrated request message) for group monitoring (for example, group-MBR monitoring), the NEF may include an uplink bitrate or a downlink bitrate, based on information included in the group monitoring information;

target of reporting: the target of reporting, which is received in operation 605. If the NEF receives the group monitoring information in operation 605 and the Npcf_PolicyAutohrization_Create request message is a message (or an integration request message) for group monitoring (for example, group-MBR monitoring), the NEF may include its own address in the target of reporting; and reporting frequency: the reporting frequency received in operation 605. If the NEF receives the group monitoring information in operation 605 and the Npcf_PolicyAutohrization_Create request message is a message (or an integration request message) for group monitoring (for example, group-MBR monitoring), the NEF may configure the reporting frequency, based on information included in group monitoring.

An indication of direct event notification: when the indication of direct event notification is received in operation 605, information for requesting the UPF to transmit monitoring information to the target of reporting may be included. If the NEF receives the group monitoring information in operation 605 and the Npcf_PolicyAutohrization_Create request message is a message (or an integration request message) for group monitoring (for example, downlink Group-MBR or uplink Group-MBR monitoring), information for requesting the UPF to transmit monitoring information to the target of reporting may be included.

In operation 620, the PCF may generate a PCC rule for a QoS flow, based on the information received in operation 615. The PCC rule may include the flow description and QoS parameter received in operation 615. If the information received in operation 615 includes the QoS parameter(s) to be measured, target of reporting, indication of direct event notification, and an individual reporting frequency, the PCF may include, in the PCC rule, at least one of information for indicating to monitor the received QoS parameter(s) to be measured, information for indicating to transmit a report to an address included in the target of reporting, information for indicating to perform reporting at an individual reporting frequency period, or information on the indication of direct event notification.

In operation 625, the PCF may include at least one piece of the following information in a message transmitted to an SMF:

SM Policy Association ID: an identifier which identifies transaction for each PDU session between the PCF and the SMF. The PCF may transmit a message including an SM policy association ID for a PDU session to the SMF, based on the information received in operation 615;

PCC rule: this may indicate the PCC rule determined in operation 620;

target of reporting: this may indicate the target of reporting determined in operation 620;

an indication of direct event notification: this may indicate the indication of direct event notification determined in operation 620; and PCR trigger for QoS monitoring: when the information received in operation 615 includes the QoS parameter(s) to be measured and individual reporting frequency, a message including information for instructing the SMF to perform QoS monitoring may be transmitted to the SMF.

In operation 630, the SMF may generate a QoS flow, based on the information received in operation 625, and transmit a response message to the PCF. The response message may include a processing result (for example, success or failure) of a request in operation 625. When the PCC rule received in operation 625 includes the QoS parameter(s) to be measured and individual reporting frequency, the SMF may transmit, to the UPF, information for indicating to report information corresponding to the QoS parameter(s) to be measured for the QoS flow, based on the reporting frequency. When the PCC rule includes the target of reporting and indication of direct notification, the SMF may transmit, to the UPF, the information for indicating to report the information corresponding to the QoS parameter(s) to be measured for the QoS flow to the target of reporting, based on the reporting frequency. If the indication of direct notification is not included, the SMF may transmit, to the UPF, the information for indicating to report the information corresponding to the QoS parameter(s) to be measured for the QoS flow to itself, based on the reporting frequency.

When the information received in operation 625 includes the PCR trigger for QOS monitoring, the SMF may report information received from the UPF to the PCF, based on the individual reporting frequency. The SMF may transmit monitoring information received from the UPF to the target of reporting included in the information received in operation 625, based on the reporting frequency.

In operation 635, the PCF may transmit a response message to the NEF. If the information received in operation 615 includes the QoS parameter(s) to be measured and individual reporting frequency and the processing result received in operation 630 indicates success, the PCF may include a subscription correlation ID in the response message transmitted to the NEF.

In operation 640, the NEF may transmit results of a monitoring information request for each UE and a QoS request for each UE to the AF. When the AF determines to transmit the results of the monitoring information request for each UE and the QoS request for each UE by including the same in a response message for each UE (for example, transmission to each of UE addresses included in a list of UE addresses), the corresponding message may include at least one piece of the following information:

subscription correlation ID: the subscription correlation ID received in operation 635 may be included;

result: the result (success or failure) for each UE received in operation 635 may be included for a UE;

UE address: an address of a corresponding UE may be included; And transaction ID: this may be an identifier for identifying a QoS flow-related request (for example, a QoS flow generation request or a monitoring request) for a group of UEs from the AF. The AF may use the transaction ID to perform monitoring-related information or QoS flow updates for the list of UE addresses.

Alternately, when the AF determines to transmit results of a monitoring information request for each UE and a QoS request for each UE by including the same in one response message for the list of UE addresses (for example, when a response message for each UE is not transmitted to the AF), the NEF may associate the subscription correlation ID included in the message received in operation 635 with the subscription correlation ID for aggregation generated in operation 615.

In addition, the response message transmitted from the NEF to the AF may include at least one piece of the following information:

subscription correlation ID for aggregation: the subscription correlation ID for aggregation generated in operation 605 may be included;

subscription correlation IDs: subscription correlation IDs included in the messages received in operation 635 may be included;

result per UE address: this may indicate the QoS flow generation result for each UE address received in operation 635. Results for all UE addresses included in the list of UE addresses received in operation 605 may be included; and transaction ID: this may be an identifier for identifying a QoS flow-related request (for example, a QoS flow generation request or a monitoring request) for a group of UEs from the AF. The AF may use the transaction ID to perform monitoring-related information or QoS flow updates for the list of UE addresses.

Further, in operation 640, the NEF may include a result of a monitoring request for a group in one response message for the list of UE addresses and transmit the message to the AF.

In operation 640, when the message transmitted in operation 615 was for monitoring information on the group (for example, group-MBR), the subscription correlation ID included in the message received in operation 635 may be associated with the subscription correlation ID for group generated in operation 615. When the NEF receives the response message of operation 635 with respect to all UE addresses included in the message received in operation 605, the NEF may transmit a response message to the AF. The response message may include at least one piece of the following information.

The corresponding message may include one or more pieces of the following information:

result: a processing result (success or failure) of a monitoring request for a group may be included. Additionally, with respect to all UEs included in the list of UE addresses, the result (success or failure) for each UE address received in operation 635 or UE addresses having received success in operation 635 (or UE addresses having received failure) may be included;

transaction ID: this may be an identifier for identifying a QoS flow-related request (for example, a QoS flow generation request or a monitoring request) for a group of UEs from the AF. The AF may use the transaction ID to perform monitoring-related information or QoS flow updates for the list of UE addresses; and subscription correlation ID for group: the subscription correlation ID for group may be included when the same is generated in operation 610.

In operation 645, when the QoS parameter(s) to be measured and reporting frequency are included in operation 605, and when, in operation 615, the NEF determines to include the QoS parameter(s) to be measured and reporting frequency in a message transmitted to the PCF in operation 615 and transmits the same, operations 645 to 655 may be omitted.

When the QoS parameter(s) to be measured and individual reporting frequency are included in operation 605, and when, in operation 615, the NEF determines to include the QoS parameter(s) to be measured and individual reporting frequency in a message transmitted to the PCF in operation 645, the NEF may include at least one piece of the following information in the message transmitted to the PCF.

event ID: an event ID indicating QoS monitoring. If the message received in operation 605 includes a group-MBR threshold, an event ID indicating group-MBR monitoring may be included;

UE address: a UE identifier;

flow description(s): the flow description received in operation 605;

QoS parameter: the QoS parameter received in operation 605;

DNN, S-NSSAI: the DNN and S-NSSAI received in operation 605;

QoS parameter(s) to be measured: the QoS parameter(s) to be measured, which is received in operation 605. The QoS parameter(s) to be measured may not be included when the same is not received in operation 605; And individual reporting frequency: the individual reporting frequency received in operation 605. The individual reporting frequency may not be included when the same is not received in operation 605.

In operation 650, the PCF may update a PCC rule, based on the message received in operation 645, and may include the PCC rule and PCR trigger for QoS monitoring in a message transmitted to the SMF. When the PCC rule received from the PCF includes the QoS parameter(s) to be measured and individual reporting frequency, the SMF may transmit, to the UPF, a message including the information for indicating to report the information corresponding to the QoS parameter(s) to be measured for the QoS flow at an individual reporting frequency period. When the information received from the PCF includes the PCR trigger for QoS monitoring, the SMF may report information received from the UPF to the PCF at an individual reporting frequency period.

In operation 655, the PCF may transmit a response message to the NEF. The response message may include a subscription correlation ID for a subscription requested by the NEF in operation 645.

In operation 660, if the SMF receives a QoS monitoring report from the UPF, the SMF may include the QoS monitoring report and SM policy association ID in a message transmitted to the PCF.

In operation 665, if the PCF receives the QOS monitoring report from the SMF, the PCF may include the QoS monitoring report, event ID indicating QoS monitoring, and subscription correlation ID in a message transmitted to the NEF.

In operation 670, the NEF may transmit a monitoring report for each UE, an aggregated monitoring report for each UE, and a monitoring report for a group to the AF.

(In the case of the aggregated monitoring report for each UE) if the NEF receives a message (or a notification message (not shown) from the UPF) of operation 665 including a subscription correlation ID associated with a subscription correlation ID for aggregation, the NEF may transmit a notification message to the AF. The notification message may include at least one piece of the following information:

- transaction ID: this may be an identifier for identifying a QoS flow-related request (a QoS flow generation request or a monitoring request) for a group of UEs from the AF;
- <event information, event ID, subscription correlation ID> per UE address: this may indicate a QoS monitoring report for each UE address, an event ID indicating Qos monitoring, and a subscription correlation ID. Corresponding information may be included for a part or all of UE address(es) included in the list of UE addresses; And
- subscription correlation ID for aggregation: the subscription correlation ID for aggregation generated in operation 605 may be included.

(In the case of the monitoring report for a group) if the NEF receives a message (or a notification message (not shown) from the UPF) of operation 665 including a subscription correlation ID associated with a subscription correlation ID for group, the NEF may transmit a notification message to the AF when the following condition is satisfied. That is, if the sum of bitrates for all UE addresses included in the message received in operation 605 is greater than a group-MBR threshold, the NEF may transmit a notification message to AF, and the notification message may include at least one piece of the following information:

- <event information, event ID, subscription correlation ID for group>: this may indicate information indicating that the sum of bitrates of QoS flows of UEs has become greater than group-MBR, an event ID indicating group monitoring (for example, an event ID indicating group-MBR monitoring), and a subscription correlation ID for group. Transaction ID: this may be an identifier for identifying a QoS flow-related request (for example, a QoS flow generation request or a monitoring request) for a group of UEs from the AF.

(In the case of the monitoring report for each UE) if the NEF receives a message (or a notification message (not shown) from the UPF) of operation 665, the NEF may transmit a notification message to the AF. The notification message may include at least one piece of the following information:

- <event information, event ID, subscription correlation ID> per UE address: this may indicate a QoS monitoring report for each UE address, an event ID, and a subscription correlation ID. Information on one UE address may be included; and
- transaction ID: this may be an identifier for identifying a QoS flow-related request (for example, a QoS flow generation request or a monitoring request) for a group of UEs from the AF.

Figure 7:
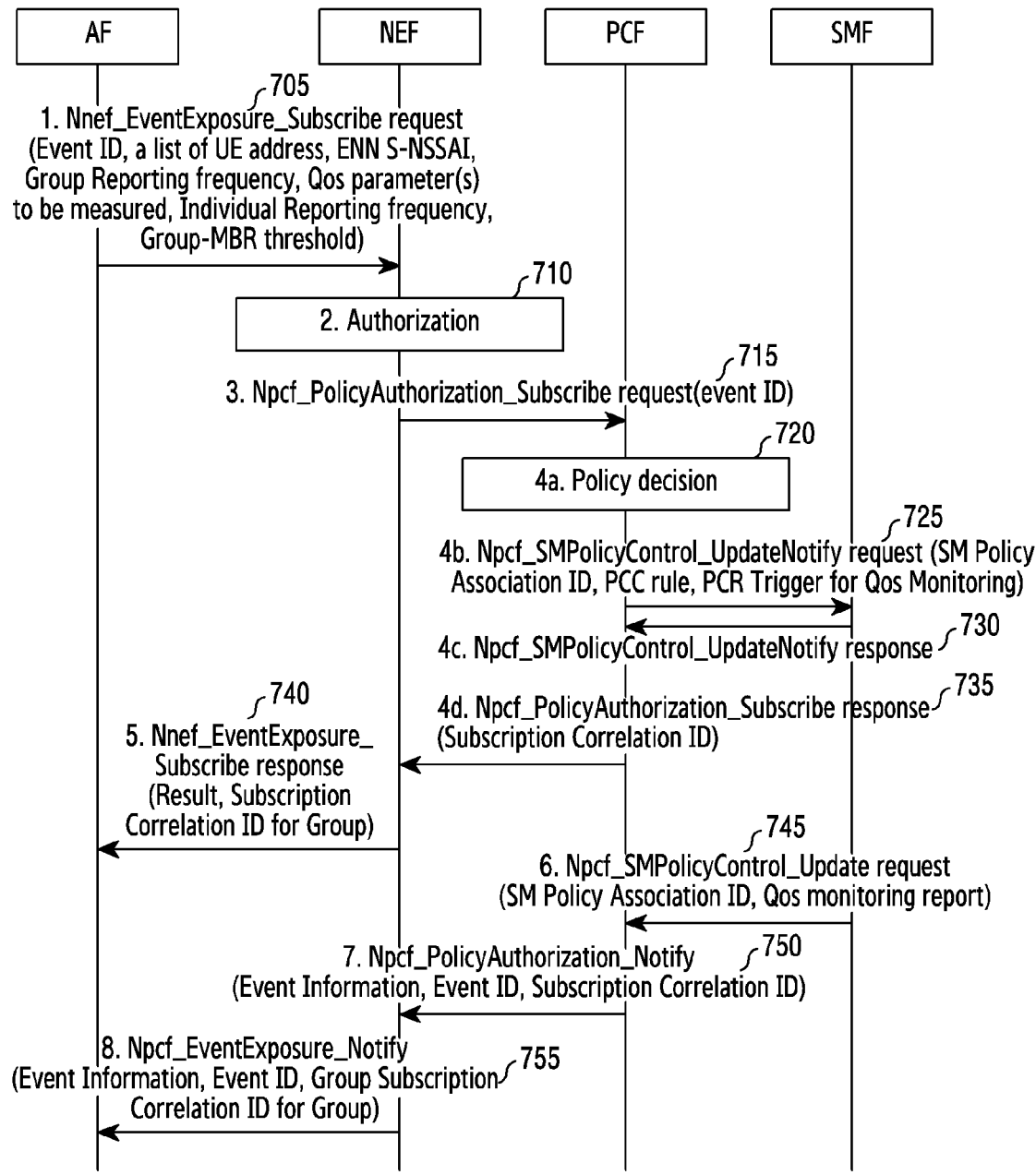
FIG. 7 illustrates a procedure in which an AF performs a QoS flow monitoring request and receives monitoring information, through an NEF, according to various embodiments of the present disclosure.

FIG. 7 illustrates a procedure in which an AF performs a QoS flow monitoring request and receives monitoring information, through an NEF, according to various embodiments of the present disclosure.

Referring to FIG. 7, in operation 705, an AF may transmit, to an NEF, a message for requesting a subscription to group-MBR monitoring information for a plurality of UEs (for example, a group of UEs). The message for requesting the subscription to the group-MBR monitoring information may include at least one piece of the following information:

- event ID: an event ID indicating group-MBR monitoring may be included;
- flow description(s): flow information for each service (for example, including at least one of a server IP address, a server port number, or protocol information);
- a list of UE addresses (or UE address): when the NEF provides an interface for receiving a list of UE addresses at once, the AF may include, in a message for requesting a subscription to group-MBR monitoring information, a list (for example, a list of UE addresses) of terminal addresses (for example, including at least one of an IP address, a MAC address, GPSI, or external identity). Alternatively, when the NEF does not provide an interface for receiving a list of UE addresses at once, the AF may include one UE address in a message for requesting a subscription to group-MBR monitoring information. When the NEF does not provide an interface for receiving a list of UE addresses at once, a QoS monitoring request message may be transmitted for each UE at the time of performing a request for the plurality of UEs;
- AF identifier: an AF identifier;
- QoS parameter(s) to be measured: information desired to be monitored for each QoS flow (for example, including at least one of delay or bitrate) may be included;
- group reporting frequency: when one or more terminal addresses are included (for example, when a request for a group is performed), a reception period of monitoring information for all target QoS flows;
- individual reporting frequency: a reception period of monitoring information for each QoS flow; and
- group-MBR threshold: this may indicate a bitrate threshold value, and if the AF desires to receive a notification of a situation where the sum of bitrates of all QoS flows subject to monitoring is higher than the bitrate threshold value, the AF may include a group-MBR threshold in a message for requesting a subscription to group-MBR monitoring information.

In operation 710, the NEF may perform an authentication procedure for the message received from the AF, based on information (for example, an AF identifier) included in the message received from the AF.

In operation 715, when the authentication is successful in operation 710, the NEF may identify a PCF address responsible for each UE address through a BSF for the list of UE addresses included in operation 705.

The NEF may include at least one piece of the following information in a subscription request message transmitted to a PCF for each UE address:

- event ID: the event ID received in operation 705 or an event ID indicating QoS monitoring may be included;
- UE address: a UE identifier;
- flow description(s): the flow description received in operation 705;
- DNN, S-NSSAI: the DNN and S-NSSAI received in operation 705;

QoS parameter(s) to be measured: the QoS parameter(s) to be measured, which is received in operation 705. When the QoS parameter(s) to be measured is not received in operation 705, and when the message received in operation 705 includes the event ID indicating group-MBR monitoring, the NEF may include information indicating bitrate monitoring in the subscription request message; And individual reporting frequency: the individual reporting frequency received in operation 705. The individual reporting frequency may not be included when the same is not received in operation 705.

In operation 720, the PCF may update a PCC rule to monitor a QoS flow, based on the information received in operation 715. When the information received in operation 715 includes the QoS parameter(s) to be measured and individual reporting frequency, the PCF may include, in the PCC rule, information for indicating to monitor QoS parameter(s) to be measured and information for indicating to perform reporting at an individual reporting frequency period.

In operation 725, the PCF may include at least one piece of the following information in a message transmitted to an SMF:

SM policy association ID: this may be an identifier for identifying transaction for each PDU session between the PCF and the SMF. The PCF may include an SM policy association ID for a PDU session in a message, based on the information received in operation 715;

PCC rule: this may indicate the PCC rule determined in operation 720; And

PCR trigger for QoS monitoring: as information included when the information received in operation 715 includes the QoS parameter(s) to be measured and individual reporting frequency, information for instructing the SMF to perform QoS monitoring may be included.

In operation 730, the SMF may update the QoS flow, based on the information received in operation 725, and transmit a response message to the PCF. The response message may include a processing result (for example, success or failure) of a request in operation 725. When the PCC rule received in operation 725 includes the QoS parameter(s) to be measured and individual reporting frequency, the SMF may transmit, to a UPF, a response message including information for indicating to report information corresponding to the QoS parameter(s) to be measured for the QoS flow at an individual reporting frequency period. When the information received in operation 725 includes the PCR trigger for QoS monitoring, the SMF may report information received from the UPF to the PCF at an individual reporting frequency period.

In operation 735, the PCF may transmit a response message to the NEF. If the information received in operation 715 includes the QoS parameter(s) to be measured and individual reporting frequency and the processing result received in operation 730 indicates success, the PCF may include a subscription correlation ID in the response message transmitted to the NEF.

In operation 740, the NEF may associate the subscription correlation ID included in the message received in operation 735 with a subscription correlation ID for group. The NEF may store the group-MBR threshold received in operation 705 for the subscription correlation ID for group.

If the NEF receives the response message of operation 735 with respect to all UE addresses included in the message received in operation 705, the NEF may transmit a response message to the AF. The response message may include at least one piece of the following information:

result: this may indicate whether processing of the subscription request in operation 705 is successful; and subscription correlation ID for group: this may indicate what generated by the NEF for the request received in operation 705. The NEF may generate the subscription correlation ID for group when the message received in operation 705 includes the group-MBR threshold.

In operation 745, if the SMF receives a QoS monitoring report from the UPF, the SMF may include the QoS monitoring report and SM policy association ID in a message transmitted to the PCF.

In operation 750, if the PCF receives the QOS monitoring report from the SMF, the PCF may include the QoS monitoring report, event ID indicating QoS monitoring, and subscription correlation ID in a message transmitted to the NEF.

In operation 755, the NEF may periodically receive the message of operation 750 with respect to all UE addresses included in the message received in operation 705. When the message received in operation 750 includes a subscription correlation ID associated with the subscription correlation ID for group, the NEF may update the sum of bitrates associated with the subscription correlation ID for group. When the group-MBR threshold corresponding to the subscription correlation ID for group is stored, the NEF may transmit a notification message to the AF when the following condition is satisfied.

That is, if the sum of bitrates for all UE addresses included in the message received in operation 705 is greater than a group-MBR threshold, the NEF may transmit a notification message to the AF, and the corresponding message may include at least one piece of the following information.

<event information, event ID, subscription correlation ID for group>: this may indicate information indicating that the sum of bitrates of QoS flows of UEs has become greater than group-MBR, an event ID indicating group-MBR monitoring, and a subscription correlation ID for group.

Figure 8:
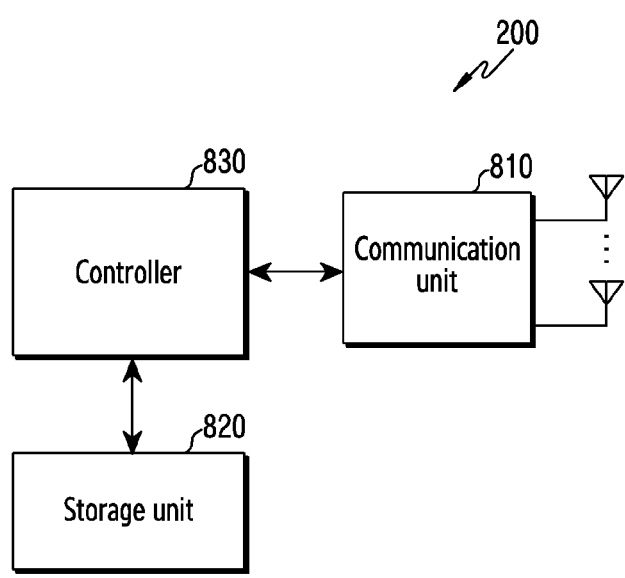
FIG. 8 illustrates the configuration of a core network object in a wireless communication system according to various embodiments of the present disclosure.

FIG. 8 illustrates the configuration of a core network object in a wireless communication system according to various embodiments of the present disclosure. A configuration 200 illustrated in FIG. 8 may be understood as a configuration of a device having at least one function among the functions 120, 130, 135, 140, 145, 160, 165, and 180 of FIG. 1. The term " . . . unit," "-er/or," or the like used hereinafter may indicate a unit which processes at least one function or operation, and this may be implemented by hardware, software, or a combination of hardware and software.

Referring to FIG. 8, a core network object includes a communication unit 810, a storage unit 820, and a controller 830.

The communication unit 810 provides an interface for communicating with other devices in a network. That is, the communication unit 810 converts a bit stream transmitted from the core network object to another device into a physical signal, and converts a physical signal received from another device into a bit stream. That is, the communication unit 810 may transmit or receive a signal. Accordingly, the communication unit 810 may be referred to as a modem, a transmitter, a receiver, or a transceiver. In this case, the communication unit 810 allows the core network object to communicate with other devices or systems through a backhaul connection (e.g., wired backhaul or wireless backhaul) or the network.

The storage unit 820 stores data such as a basic program, an application program, and configuration information for the operation of the core network object. The storage unit 820 may include a volatile memory, a non-volatile memory, or a combination of the volatile memory and the non-volatile memory. In addition, the storage unit 820 provides stored data according to a request of the controller 830.

The controller 830 controls the overall operations of the core network object. For example, the controller 830 transmits or receives a signal through the communication unit 810. In addition, the controller 830 records and reads data on and from the storage unit 820. To this end, the controller 830 may include at least one processor. According to various embodiments of the disclosure, the controller 830 may control to perform synchronization using a wireless communication network. For example, the controller 830 may control the core network object to perform operations according to the various embodiments described above.

Figure 9:
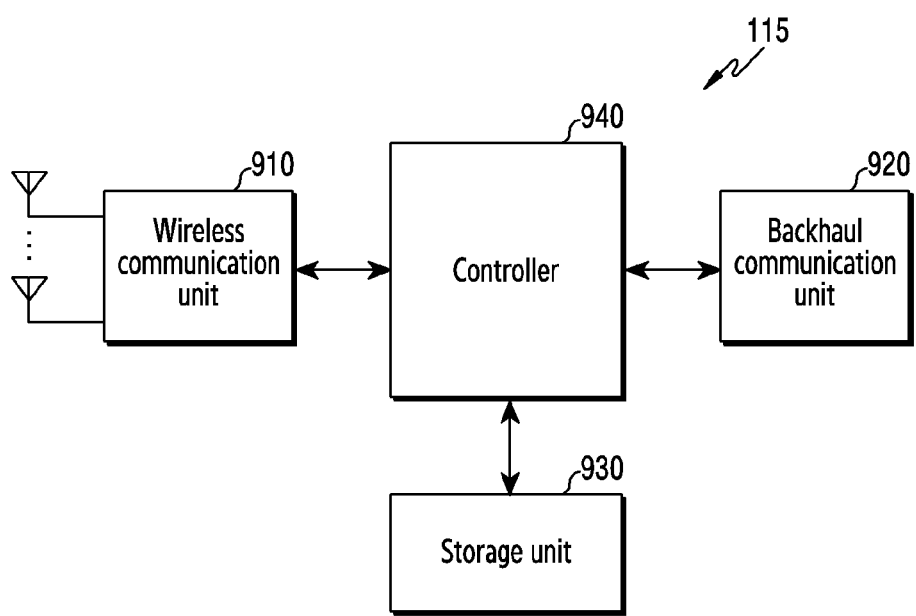
FIG. 9 illustrates the configuration of a base station in a wireless communication system according to various embodiments of the present disclosure.

FIG. 9 illustrates the configuration of a base station in a wireless communication system according to various embodiments of the present disclosure. The configuration illustrated in FIG. 9 may be understood as a configuration of the base station 115. The term " . . . unit," "-er/or," or the like used hereinafter may indicate a unit which processes at least one function or operation, and this may be implemented by hardware, software, or a combination of hardware and software.

Referring to FIG. 9, the base station 115 includes a wireless communication unit 910, a backhaul communication unit 920, a storage unit 930, and a controller 940.

The wireless communication unit 910 performs functions for transmitting or receiving a signal through a wireless channel. For example, the wireless communication unit 910 performs a conversion function between a baseband signal and a bit stream according to a physical layer standard of a system. For example, at the time of data transmission, the wireless communication unit 910 generates complex symbols by encoding and modulating transmission bit streams. In addition, at the time of data reception, the wireless communication unit 910 restores a reception bit stream through demodulation and decoding of a baseband signal.

In addition, the wireless communication unit 910 up-converts a baseband signal into a radio frequency (RF) band signal and then transmits the RF band signal through an antenna, and down-converts the RF band signal received through the antenna into the baseband signal. To this end, the wireless communication unit 910 may include a transmission filter, a reception filter, an amplifier, a mixer, an oscillator, a digital to analog convertor (DAC), an analog to digital convertor (ADC), and the like. In addition, the wireless communication unit 910 may include a plurality of transmission/reception paths. Furthermore, the wireless communication unit 910 may include at least one antenna array including a plurality of antenna elements.

In terms of hardware, the wireless communication unit 910 may include a digital unit and an analog unit, and the analog unit may include a plurality of sub-units according to an operation power, an operation frequency, etc. The digital unit may be implemented as at least one processor (e.g., a digital signal processor (DSP)).

The wireless communication unit 910 transmits and receives a signal as described above. Accordingly, all or a part of the wireless communication unit 910 may be referred to as a "transmitter," a "receiver," or a "transceiver." In addition, in the following description, transmission and reception performed through a wireless channel refers to the above-described processing performed by the wireless communication unit 910.

The backhaul communication unit 920 provides an interface for performing communication with other nodes in the network. That is, the backhaul communication unit 920 converts a bit stream transmitted from the base station to another node, for example, another access node, another base station, an upper node, a core network, etc. into a physical signal, and converts a physical signal received from another node into a bit stream.

The storage unit 930 stores data such as a basic program, an application program, and configuration information for the operation of the base station. The storage unit 930 may include a volatile memory, a non-volatile memory, or a combination of the volatile memory and the non-volatile memory. In addition, the storage unit 930 provides stored data according to a request of the controller 940.

The controller 940 controls the overall operations of the base station. For example, the controller 940 transmits and receives a signal through the wireless communication unit 910 or the backhaul communication unit 920. In addition, the controller 940 records and reads data on and from the storage unit 930. In addition, the controller 940 may perform functions of a protocol stack required by communication standards. According to another implementation example, the protocol stack may be included in the wireless communication unit 910. To this end, the controller 940 may include at least one processor.

According to various embodiments, the controller 940 may control the base station to perform operations according to the various embodiments described above.

Figure 10:
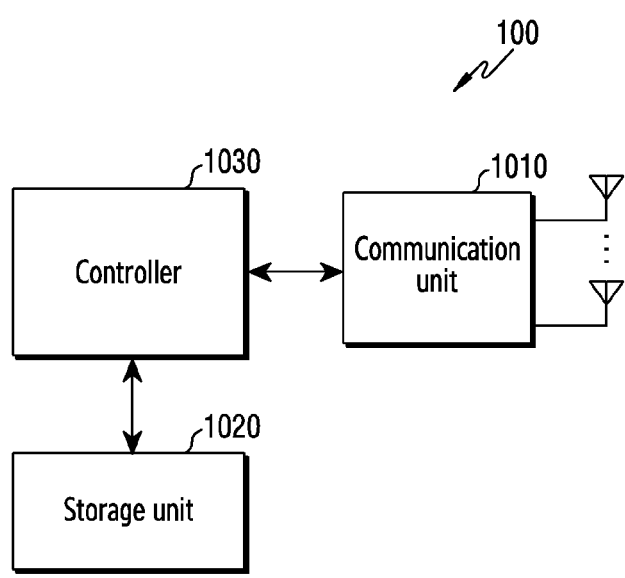
FIG. 10 illustrates the configuration of a terminal in a wireless communication system according to various embodiments of the present disclosure.

FIG. 10 illustrates the configuration of a terminal in a wireless communication system according to various embodiments of the present disclosure. The configuration illustrated in FIG. 10 may be understood as a configuration of the terminal 100. The term " . . . unit," "-er/or," or the like used hereinafter may indicate a unit which processes at least one function or operation, and this may be implemented by hardware, software, or a combination of hardware and software.

Referring to FIG. 10, the terminal includes a communication unit 1010, a storage unit 1020, and a controller 1030.

The communication unit 1010 performs functions for transmitting or receiving a signal through a wireless channel. For example, the communication unit 1010 performs a conversion function between a baseband signal and a bit stream according to a physical layer standard of a system. For example, at the time of data transmission, the communication unit 1010 generates complex symbols by encoding and modulating transmission bit streams. In addition, at the time of data reception, the communication unit 1010 restores a reception bit stream through demodulation and decoding of a baseband signal. In addition, the communication unit 1010 up-converts a baseband signal into an RF band signal and then transmits the RF band signal through an antenna, and down-converts the RF band signal received through the antenna into the baseband signal. For example, the communication unit 1010 may include a transmission filter, a reception filter, an amplifier, a mixer, an oscillator, a DAC, an ADC, and the like.

In addition, the communication unit 1010 may include a plurality of transmission/reception paths. Furthermore, the communication unit 1010 may include at least one antenna array including a plurality of antenna elements. In terms of hardware, the communication unit 1010 may include a digital circuit and an analog circuit (e.g., a radio frequency integrated circuit (RFIC)). The digital circuit and the analog circuit may be implemented in one package. In addition, the communication unit 1010 may include a plurality of RF chains. Furthermore, the communication unit 1010 may perform beamforming.

The communication unit 1010 transmits and receives a signal as described above. Accordingly, all or a part of the communication unit 1010 may be referred to as a "transmitter," a "receiver," or a "transceiver." In addition, in the following description, transmission and reception performed through a wireless channel refers to the above-described processing performed by the communication unit 1010.

The storage unit 1020 stores data such as a basic program, an application program, and configuration information for the operation of the terminal. The storage unit 1020 may include a volatile memory, a non-volatile memory, or a combination of the volatile memory and the non-volatile memory. In addition, the storage unit 1020 provides stored data according to a request of the controller 1030.

The controller 1030 controls the overall operations of the terminal. For example, the controller 1030 transmits and receives a signal through the communication unit 1010. In addition, the controller 1030 records and reads data on and from the storage unit 1020. In addition, the controller 1030 may perform functions of a protocol stack required by communication standards. To this end, the controller 1030 may include at least one processor or microprocessor or may be a part of the processor. In addition, a part of the communication unit 1010 and the controller 1030 may be referred to as a communication processor (CP).

According to various embodiments, the controller 1030 may control the terminal to perform operations according to the various embodiments described above.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, a digital versatile disc (DVD) or other optical storage device, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a provided situation for the convenience of explanation, the disclosure is not limited to a single component or a plurality of components, the components expressed in the plural form may be configured as a single component, and the components expressed in the singular form may be configured as a plurality of components.

Meanwhile, while the specific embodiment has been described in the explanations of the disclosure, it will be noted that various changes may be made therein without departing from the scope of the disclosure. Therefore, the scope of the disclosure is not limited and defined by the described embodiment and is defined not only the scope of the claims as below but also their equivalents.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Furthermore, although the above embodiments have been presented based on the FDD LTE system, other variants based on the technical idea of the above embodiments may also be implemented in other systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described above. The above description of the disclosure is merely for the sake of illustration, and embodiments of the disclosure are not limited to the embodiments set forth herein. Those skilled in the art will appreciate that the disclosure may be easily modified and changed into other specific forms without departing from the technical idea or essential features of the disclosure. Therefore, the scope of the disclosure should be determined not by the above detailed description but by the appended claims, and all modification sand changes derived from the meaning and scope of the claims and equivalents thereof shall be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network exposure function (NEF) entity in a wireless communication system, the method comprising:
  receiving, from an application function (AF) entity, a first message associated with a generation of a quality of service (QOS), wherein the first message includes information on a set of user equipments (UEs) and the information includes an address list of the UEs and a threshold associated with QoS monitoring;
  transmitting, to each of a plurality of policy control function (PCF) entities, a second message for a QoS monitoring report for a UE address included in the address list;
  receiving, from a user plane function (UPF) entity, a QoS monitoring event in response to the second message; and
  transmitting, to the AF entity, a third message including QoS monitoring reports for the set of the UEs, in case that an aggregated data rate for the set of the UEs exceeds the threshold.

2. A network exposure function (NEF) entity in a wireless communication system, the NEF entity comprising:
  a transceiver; and
  at least one processor coupled with the transceiver and configured to:
    receive, from an application function (AF) entity, a first message associated with a generation of a quality of service (QOS), wherein the first message includes information on a set of user equipments (UEs) and the information includes an address list of the UEs and a threshold associated with QoS monitoring,
    transmit, to each of a plurality of policy control function (PCF) entities, a second message for a QoS monitoring report for a UE address included in the address list,
    receive, from a user plane function (UPF) entity, a QoS monitoring event in response to the second message, and
    transmit, to the AF entity, a third message including QoS monitoring reports for the set of the UEs, in case that an aggregated data rate for the set of the UEs exceeds the threshold.

* * * * *